US006746992B2

(12) United States Patent
Kippie et al.

(10) Patent No.: US 6,746,992 B2
(45) Date of Patent: Jun. 8, 2004

(54) HIGH DENSITY THERMALLY STABLE WELL FLUIDS

(75) Inventors: David P. Kippie, Katy, TX (US); Robert L. Horton, Sugarland, TX (US); William E. Foxenberg, Houston, TX (US)

(73) Assignee: M-I, L.L.C., Houston, TX (US)

( * ) Notice: Subject to any disclaimer, the term of this patent is extended or adjusted under 35 U.S.C. 154(b) by 165 days.

(21) Appl. No.: 10/010,188

(22) Filed: Dec. 6, 2001

(65) Prior Publication Data

US 2003/0032561 A1 Feb. 13, 2003

Related U.S. Application Data

(60) Provisional application No. 60/307,805, filed on Jul. 25, 2001.

(51) Int. Cl.$^7$ ................................................. C09K 7/02
(52) U.S. Cl. ................ 507/103; 507/141; 507/145; 507/203; 507/267; 507/276; 507/277
(58) Field of Search ................ 507/103, 141, 507/145, 203, 267, 276, 277

(56) References Cited

U.S. PATENT DOCUMENTS

| | | | |
|---|---|---|---|
| 4,299,825 A | 11/1981 | Lee | 424/180 |
| 4,427,556 A | 1/1984 | House et al. | 252/8.5 A |
| 4,486,340 A | 12/1984 | Glass, Jr. | 252/8.55 D |
| 4,536,297 A | 8/1985 | Loftin et al. | 252/8.5 C |
| 4,566,977 A | 1/1986 | Hatfield | 252/8.5 C |
| 4,599,180 A | 7/1986 | Vio et al. | 252/8.55 D |
| 4,607,099 A | 8/1986 | Kanda et al. | 536/114 |
| 4,614,601 A | 9/1986 | Sekimoto et al. | 252/8.551 |
| 4,661,266 A | 4/1987 | Kanda et al. | 252/8.551 |
| 4,900,457 A | 2/1990 | Clarke-Sturman et al. | 252/8.514 |
| 5,785,747 A * | 7/1998 | Vollmer et al. | 106/194.2 |
| 5,804,535 A * | 9/1998 | Dobson et al. | 507/111 |
| 6,017,856 A * | 1/2000 | Van Ooyen | 507/276 |
| 6,100,222 A * | 8/2000 | Vollmer et al. | 507/113 |
| 6,239,081 B1 * | 5/2001 | Korzilius et al. | 507/145 |
| 6,248,700 B1 * | 6/2001 | Vollmer et al. | 507/277 |
| 6,423,802 B1 * | 7/2002 | Miller et al. | 526/287 |
| 6,436,879 B1 * | 8/2002 | Brown et al. | 507/145 |
| 6,454,005 B1 * | 9/2002 | Smith | 166/294 |

FOREIGN PATENT DOCUMENTS

| | | |
|---|---|---|
| EP | 0 040 445 A1 | 11/1981 |
| EP | 0 130 647 A2 | 1/1985 |
| EP | 0 572 113 A1 | 4/1993 |
| GB | 1 549 734 | 8/1979 |
| WO | WO 97/26311 | 7/1997 |

* cited by examiner

*Primary Examiner*—Philip C. Tucker
(74) *Attorney, Agent, or Firm*—Osha & May L.L.P.

(57) ABSTRACT

High density, thermally stable, brine-based well fluids and methods of using the same are disclosed. In one embodiment a well fluid including water and a salt, the salt including at least one formate salt, wherein the weight-to-volume ratio of the well fluid is within the range of at least 120% to about 400% is disclosed. In another embodiment, a well fluid including water, a viscosifying agent, and a salt, the salt including at least one formate salt, wherein the weight-to-volume ratio of the well fluid is within the range of at least 120% to about 400% is disclosed. A method of treating a well using a well fluid, wherein the well fluid includes water and a salt, the salt including at least one formate salt, wherein the weight-to-volume ratio of the well fluid is within the range of at least 120% to about 400% is also disclosed.

40 Claims, No Drawings

HIGH DENSITY THERMALLY STABLE WELL FLUIDS

CROSS-REFERENCE TO RELATED APPLICATIONS

This application claims the benefit of U.S. Provisional Application No. 60/307,805 filed on Jul. 25, 2001.

BACKGROUND OF INVENTION

1. Field of the Invention

The invention relates generally to well drilling and completion fluids.

More specifically, the present invention relates to high density, thermally stable, brine-based well fluids.

2. Background Art

When drilling or completing wells in earth formations, various fluids typically are used in the well for a variety of reasons. The fluid often is water-based. For the purposes herein, such fluid will be referred to as "well fluid." Common uses for well fluids include: lubrication and cooling of drill bit cutting surfaces while drilling generally or drilling-in (i.e., drilling in a targeted petroliferous formation), transportation of "cuttings" (pieces of formation dislodged by the cutting action of the teeth on a drill bit) to the surface, controlling formation fluid pressure to prevent blowouts, maintaining well stability, suspending solids in the well, minimizing fluid loss into and stabilizing the formation through which the well is being drilled, fracturing the formation in the vicinity of the well, displacing the fluid within the well with another fluid, cleaning the well, testing the well, fluid used for implacing a packer, abandoning the well or preparing the well for abandonment, and otherwise treating the well or the formation.

One issue that arises in drilling operations relates to the thermal stability of the well fluids. Temperatures in subsurface formations generally rise approximately 0.5–1° C. (gradient varies with location) per hundred feet of depth. Many well fluids contain additives that may undergo severe chemical degradation in the presence of elevated temperatures, which may lead to a variety of problems.

Brines (such as, for example, aqueous $CaBr_2$) commonly are used as well fluids because of their wide density range and the fact that brines are typically substantially free of suspended solids. In addition, brines are often used in order to achieve a suitable density for use in well-drilling operations. Typically, the brines comprise halide salts of mono- or divalent cations, such as sodium, potassium, calcium, and zinc. Chloride-based brines of this type have been used in the petroleum industry for over 50 years; and bromide-based brines, for at least 25 years; but formate-based brines have only been widely used in the industry relatively recently (roughly the past ten years). One additional advantage of using brines is that brines typically do not damage certain types of downhole formations; and for formations that are found to interact adversely with one type of brine, often there is another type of brine available with which that formation will not interact adversely.

A variety of compounds are typically added to brine-based well fluids. For example, a brine-based well fluid may also include visosifiers, corrosion inhibitors, lubricants, pH control additives, surfactants, solvents, and/or weighting agents, among other additives. Some typical brine-based well fluid viscosifying additives include natural polymers and derivatives thereof such as xanthan gum and hydroxyethyl cellulose (HEC). In addition, a wide variety of polysaccharides and polysaccharide derivatives may be used, as is well known in the art.

Some synthetic polymer and oligomer additives such as poly(ethylene glycol)(PEG), poly(diallyl amine), poly(acrylamide), poly(aminomethylpropylsulfonate[AMPS]), poly(acrylonitrile), poly(vinyl acetate), poly(vinyl alcohol), poly(vinyl amine), poly(vinyl sulfonate), poly(styryl sulfonate), poly(acrylate), poly(methyl acrylate), poly(methacrylate), poly(methyl methacrylate), poly(vinylpyrrolidone), poly(vinyl lactam), and co-, ter-, and quater-polymers of the following co-monomers: ethylene, butadiene, isoprene, styrene, divinylbenzene, divinyl amine, 1,4-pentadiene-3-one (divinyl ketone), 1,6-heptadiene-4-one (diallyl ketone), diallyl amine, ethylene glycol, acrylamide, AMPS, acrylonitrile, vinyl acetate, vinyl alcohol, vinyl amine, vinyl sulfonate, styryl sulfonate, acrylate, methyl acrylate, methacrylate, methyl methacrylate, vinylpyrrolidone, and vinyl lactam are also often used as viscosifiers.

One example of how a brine-based well fluid may be used in combination with the above listed polymers and oligomers is set forth below. When drilling progresses to the depth of penetrating a hydrocarbon bearing formation, special care may be required to maintain the stability of the wellbore. Examples of formations in which stability problems often arise include highly permeable and/or poorly consolidated formations. In these types of formations, a drilling technique known as "under-reaming" may be used. In under-reaming, the wellbore is drilled to penetrate the hydrocarbon bearing zone using conventional techniques. A casing generally is set in the wellbore to a point just above the hydrocarbon bearing zone. The hydrocarbon bearing zone then may be re-drilled, for example, using an expandable under-reamer that increases the diameter of the already-drilled wellbore below the casing.

Under-reaming is usually performed using special "clean" drilling fluids. Typical drilling fluids used in under-reaming are expensive, aqueous, dense brines that are viscosified with a gelling and/or cross-linked polymer to aid in the removal of formation cuttings. The high permeability of the target formation, however, may allow large quantities of the drilling fluid to be lost into the formation. Once the drilling fluid is lost into the formation, it becomes difficult to remove. Calcium and zinc bromide brines can form highly stable, acid insoluble compounds when reacted with the formation or substances contained therein. This reaction may reduce the permeability of the formation to any subsequent out-flow of targeted hydrocarbons. One of the most effective ways to prevent such damage to the formation is to limit fluid loss into the formation.

Thus, providing effective fluid loss control is highly desirable to prevent damaging the formation in, for example, completion, drilling, drill-in, displacement, hydraulic fracturing, work-over, packer fluid implacement or maintenance, well treating, or testing operations. Techniques that have been developed to control fluid loss include the use of fluid loss "pills." Significant research has been directed to determining suitable materials for the fluid loss pills, as well as controlling and improving the properties of the fluid loss pills. Typically, fluid loss pills work by enhancing filter-cake buildup on the face of the formation to inhibit fluid flow from the wellbore into the formation.

Because of the high temperatures, high shear (caused by the pumping and placement), high pressures, and low pH to which well fluids are often exposed (i.e., "stress conditions"), the above described polymeric additives used to form fluid loss pills, and to viscosify the well fluids, tend to degrade rather quickly. In addition, even in well fluids without these polymeric additives, other chemical species present in the well fluid may decompose or undergo undesirable reactions. Brine-based well fluids, therefore, are used for a variety of applications in well drilling, both with and without polymeric additives. Increasing the thermal stability of brine-based well fluids, therefore, is a significant concern.

U.S. Pat. No. 4,900,457 (the '457 patent) describes one method of raising the thermal stability of these well fluids. In particular, the '457 patent discloses an aqueous polysaccharide composition comprising 0.03 to 5% weight per volume (w/v) of a water-soluble polysaccharide, 5 to 120% w/v of at least one salt of at least one mono- or divalent cation, wherein at least 0.05% w/v, based on the composition of the at least one salt is formate, the balance of the salt, if any, being at least one halide. Further, the '457 patent states that the most preferable amount of formate is 10% w/v.

High density, brine-based well fluids have become increasingly important for a variety of applications, such as well completion. Along with having high densities, these brine-based well fluids must also be thermally stable. What is needed, therefore, are high density, thermally stable, brine-based well fluids for use in a variety of applications.

SUMMARY OF INVENTION

In one aspect, the present invention relates to a high density, thermally stable well fluid, wherein the well fluid includes water and a salt, wherein the salt includes at least one formate salt, and wherein a weight-to-volume ratio of the salt in the well fluid is within the range of at least 120% to about 400%.

In another aspect, the present invention relates to a high density, thermally stable well fluid, wherein the well fluid includes water, a viscosifying agent, and a salt, the salt including at least one formate salt, wherein the weight-to-volume ratio of the salt in the well fluid is within the range of at least 120% to about 400%.

In another aspect, the present invention relates to a method of treating a well which includes injecting a well treating fluid into the well, wherein the well treating fluid includes water and a salt, the alt including at least one formate salt, wherein the weight-to-volume ratio of the salt contained in the well fluid is within the range of at least 120% to about 400%.

Other aspects and advantages of the invention will be apparent from the following description and the appended claims.

DETAILED DESCRIPTION

In general, the present invention relates to compositions and methods of using high density, thermally stable well fluids (such as kill fluids, or fluid loss control pills, for example) that can sustain stress conditions for extended periods of time without significant fluid loss or loss of desirable rheological properties. The stress conditions may include, for example, exposure to high shear in pumping and placement, exposure to oxidizing breakers (including oxygen dissolved in the fluid), exposure to brines having high divalent cation content, high temperatures, high differential pressures, low pH, extended times, and a combination of two or more of such stress conditions. These fluids are advantageously used in or in connection with drilling, drill-in, displacement, completion, hydraulic fracturing, work-over, packer fluid implacement or maintenance, well treating, testing, or abandonment.

More specifically, the present invention relates to high density, thermally stable, brine based well fluids and methods of using the same. Those skilled in the art will appreciate that 1% w/v (one percent weight-to-volume ratio) corresponds to a concentration of 10 kg/m$^3$ (10 g/l) of composition. Thus, as defined, the weight-to-volume ratio represents the grams of solute (salt) in the liters of solution, and it includes salt that may be either dissolved or suspended in the solution at room temperature, inasmuch as said suspended salt may become soluble at a higher temperature. In particular, the present invention discloses formate-containing well fluids having a weight-to-volume ratio of greater than 120% to approximately 400%. The present invention comprises compositions having only formate as the anoic component of the brine, as well as mixed salt systems. "Effective," as used throughout the specification, simply means an amount sufficient to raise the temperature stability of a given well fluid by a measurable amount.

To test compositions of various embodiments of the invention, fluid loss properties of the compositions described below were determined as follows. Fluid loss tests of durations ranging from 30 seconds to 48 hours were performed in an API standard high pressure high temperature (HPHT) apparatus (Ref.: API 13-B1 with one modification: substituting an Aloxite or ceramic disk for paper). The testing temperature used in obtaining the below readings was predetermined, such as, for example, in accordance with a bottom-hole temperature at which the fluid will be used in the field.

The HPHT apparatus was operated at 500 psig differential pressure, using, for example, a nominally 65 milliDarcy Aloxite disc (HPHT cell). In general, for the fluid lost tests, a 500 mL HPHT cell is loaded into the HPHT apparatus, which is then pressurized and heated to a predetermined temperature. A discharge valve located on the HPHT apparatus is then opened, and a filtrate volume is measured with respect to time. No limitation on the scope of the present invention is intended by the discussion of the above testing method. Moreover, no limitation should be placed on the scope of the invention by the discussion of use of such fluids as fluid loss control pills. For example, it is expressly within the scope of the present invention that the compositions described below may be used as any type of well fluid.

In one embodiment of the invention, a mixture, termed "formulation 1," was prepared in the following manner. A mixture of 141.68 mL of 17.3 pounds per gallon (ppg) cesium formate and 148.79 mL of 13.1 ppg potassium formate was prepared by adding to the brines a dry reagent comprising 2 grams of xanthan gum (a biopolymer) and 10 grams of potassium carbonate as a dry reagent. To this mixture, 10 grams of modified starch was then added as a dry reagent. 100 grams of sodium bromide was then added as a dry reagent to the mixture. Next, 45 grams of calcium carbonate was added as a dry reagent. The weight-to-volume ratio of salt in the resulting composition was determined to be 174.44%.

Significantly, at room temperature, not all of the sodium bromide remains in solution. However, once the temperature of the solution is raised above room temperature (but well below the operating temperature in a typical well), the sodium bromide is dissolved, leaving only an aqueous phase.

Formulation 1 was then hot rolled in an oven at 250° F. for approximately 1 hour. After hot rolling, formulation 1 was placed in a standard HPHT fluid loss cell (as described above). A fluid loss test was then conducted at 400° F.

according to API 13-B1 with one modification: substituting an Aloxite or ceramic disk for paper. Fluid loss was measured at 30 seconds, 1 hour, 2 hours, 3 hours, and 4.5 hours. Blowout (i.e., loss of fluid control) occurred after 4.5 hours.

In another embodiment, a mixture, termed "formulation 2," was prepared in the following manner. To 247.45 mL of 13.1 ppg potassium formate brine solution was added, with stirring, a dry reagent comprising 2 grams of scleroglucan (a biopolymer) was mixed with 10 grams of potassium carbonate as a dry reagent. To this mixture, 10 grams of modified starch was then added as a dry reagent. 175 grams of sodium bromide was then added as a dry reagent to the mixture. Next, 100 grams of calcium carbonate was added as a dry reagent. The dry reagent mixture. The weight-to-volume ratio of salt in the resulting composition was determined to be 187.12%.

Formulation 2 was then hot rolled in an oven at 250° F. for approximately 1 hour. After hot rolling, formulation 2 was placed in a standard HPHT (as described above) fluid loss cell. A fluid loss test was then conducted at 400° F. according to API 13-B1 with one modification: substituting an Aloxite or ceramic disk for paper. Fluid loss was measured at 30 seconds, 1 hour, 2 hours, 3 hours, 4.5 hours, and 8.75 hours. No blowout (i.e., loss of fluid control) occurred during the testing of formulation 2.

For comparison, a mixture, "comparison 1," was prepared in the following manner. A dry reagent comprising 0.75 grams of xanthan gum (a biopolymer) was mixed with 6 grams of modified starch as a dry reagent. Next, 35 grams of calcium carbonate was added as a dry reagent. The dry reagent mixture was then added, with stirring, to 311.15 mL of 12.8 ppg potassium formate brine solution. The weight-to-volume ratio of salt in the resulting composition was determined to be 117.0%. The density of the aqueous phase was found to be approximately 13.1 ppg.

Comparison 1 was then hot rolled in an oven at 250° F. for approximately 1 hour. After hot rolling, comparison 1 was placed in a standard HPHT (as described above) fluid loss cell. A fluid loss test was then conducted at 400° F. according to API 13-B 1 with one modification: substituting an Aloxite or ceramic disk for paper. Fluid loss was measured at 30 seconds, 1 hour, 2 hours, 3 hours, 4.5 hours, and 8.75 hours.

TABLE 1

| Formulation | Fluid Loss Over Time | | | | | |
| --- | --- | --- | --- | --- | --- | --- |
| | 30 sec fluid loss (mL) | 1 hr fluid loss (mL) | 2 hr fluid loss (mL) | 3 hr fluid loss (mL) | 4.5 hr fluid loss (mL) | 8.75 hr fluid loss (mL) |
| 1 | 10 | 12 | 12.5 | 58 | Blowout | — |
| 2 | 10 | 24 | 40 | 45 | 57 | 57 |
| Comparison 1 | 50 | blowout (occurred by 30 min) | | | | |

From the above results, formulations 1 and 2 increase a thermal stability of the well fluid with respect to fluid loss. Typically, useful ranges of temperatures (i.e., the temperature range in which the polymer provides additional viscosity) for sceroglucan and xanthan gum are about 225° F.–275° F. In the above examples, however, the useful temperature range of the well fluid has been extended significantly.

In another embodiment, a mixture, termed "formulation 3," was prepared in the following manner. A dry reagent comprising 2 grams of scleroglucan (a biopolymer), as a dry reagent, was mixed with 23.6 grams of cesium carbonate (as compared with potassium carbonate of the previous two formulations) as a dry reagent. To this mixture, 10 grams of modified starch was then added as a dry reagent. 361.9 grams of cesium bromide was then added as a dry reagent to the mixture. Next, 100 grams of calcium carbonate was added as a dry reagent. The dry reagent mixture was then added, with stirring, to 247.45 mL of 19.2 ppg cesium formate brine solution. The weight-to-volume ratio of salt in the resulting composition was determined to be 360.33%.

In another embodiment, a mixture, termed "formulation 4," was prepared in the following manner. A mixture of 141.68 mL of 17.3 ppg cesium formate and 148.79 mL of 13.1 ppg potassium formate was prepared. To this mixture was added, with stirring, dry reagent comprising 2 grams of xanthan gum (a biopolymer) and 10 grams of potassium carbonate as a dry reagent. To this mixture, 10 grams of modified starch was then added as a dry reagent. 30.46 grams of sodium bromide was then added as a dry reagent to the mixture. Next, 45 grams of calcium carbonate was added as a dry reagent.

The weight-to-volume ratio of salt in the resulting composition was determined to be 155.91%. At room temperature, all of the potassium carbonate and sodium bromide remains in solution. The density of the aqueous phase at 70° F. is approximately 15.4 ppg.

In another embodiment, a mixture, termed "formulation 5," was prepared in the following manner. To 247.45 mL of 13.1 ppg potassium formate brine solution was added, with stirring, a dry reagent comprising 2 grams of scleroglucan (a biopolymer), as a dry reagent, and 5 grams of potassium carbonate as a dry reagent. To this mixture, 10 grams of modified starch was then added as a dry reagent. Four grams of sodium bromide was then added as a dry reagent to the mixture. Next, 100 grams of calcium carbonate was added as a dry reagent. The weight-to-volume ratio of salt in the resulting composition was determined to be 165.27%. At room temperature, all of the potassium carbonate and sodium bromide remains in solution.

In another embodiment, a mixture, termed "formulation 6," was prepared in the following manner. A dry reagent comprising 2 grams of scleroglucan (a biopolymer), was mixed with 23.6 grams of cesium carbonate (as compared with potassium carbonate of the previous two formulations) as a dry reagent. To this mixture, 10 grams of modified starch was then added as a dry reagent. 7.24 grams of cesium bromide was then added as a dry reagent to the mixture. Next, 100 grams of calcium carbonate was added as a dry reagent. The dry reagent mixture was then added, with stirring, to 247.45 mL of 19.2 ppg cesium formate brine solution. The weight-to-volume ratio of salt in the resulting composition was determined to be 230.42%. At room temperature, all of the cesium carbonate and cesium bromide remains in solution.

In another embodiment, a mixture, termed "formulation 7," was prepared in the following manner. A dry reagent comprising 0.75 grams of xanthan gum (a biopolymer) was mixed with 6 grams of modified starch as a dry reagent. 361.9 grams of cesium bromide was then added as a dry reagent to the mixture. Next, 35 grams of calcium carbonate was added as a dry reagent. The dry reagent mixture was then added, with stirring, to 311.15 mL of 19.5 ppg cesium formate brine solution (84.4 wt % cesium formate). The weight-to-volume ratio of salt in the resulting composition was determined to be 298.15%. At room temperature, all of the cesium bromide remains in solution.

In another embodiment, a mixture, termed "formulation 8," was prepared in the following manner. To 311.15 mL of 12.8 ppg potassium formate brine solution was added, with stirring, a dry reagent comprising 0.75 grams of xanthan gum (a biopolymer) and 6 grams of modified starch as a dry reagent. 70.0 grams of cesium bromide was then added as a dry reagent to the mixture. Next, 35 grams of calcium carbonate was added as a dry reagent. The weight-to-volume ratio of salt in the resulting composition was determined to be 133.87%. At room temperature, not all of the sodium bromide remains in solution; but at about 200° F., all of the sodium bromide does go into solution.

Formulation 8 was then hot rolled in an oven at 250° F. for approximately 1 hour. After hot rolling, formulation 8 was placed in a standard HPHT (as described above) fluid loss cell. A fluid loss test was then conducted at 400° F. according to API 13-B1 with one modification: substituting an Aloxite or ceramic disk for paper. Fluid loss was measured at 30 seconds, 30 minutes, 1 hour, and 1.5 hours.

For comparison, a mixture, "comparison 2," was prepared in the following manner. To 311.15 mL of 12.8 ppg potassium formate brine solution was added, with stirring, a dry reagent comprising 0.75 grams of xanthan gum (a biopolymer) and 6 grams of modified starch as a dry reagent. Next, 35 grams of calcium carbonate was added as a dry reagent. The weight-to-volume ratio of salt in the resulting composition was determined to be 117.0%. The density of the aqueous phase was found to be approximately 13.1 ppg.

Comparison 2 was then hot rolled in an oven at 250° F. for approximately 1 hour. After hot rolling, comparison 2 was placed in a standard HPHT (as described above) fluid loss cell. A fluid loss test was then conducted at 400° F. according to API 13-B1 with one modification: substituting an Aloxite or ceramic disk for paper. Fluid loss was measured at 30 seconds, 30 minutes, 1 hour, and 1.5 hours.

The results are summarized below.

TABLE 2

| | Fluid Loss Over Time | | | |
|---|---|---|---|---|
| Formulation | 30 sec fluid loss (mL) | 30 min fluid loss (mL) | 1 hr fluid loss (mL) | 1.5 hr fluid loss (mL) |
| 8 | 5 | 6 | 10 | blowout |
| Comparison 2 | 50 | blowout | — | — |

From the above results, formulation 8 provides significant thermal stability to the well fluid. Typically, useful ranges of temperatures (i.e., the temperature range in which the polymer provides additional viscosity) for sceroglucan and xanthan gum are about 225° F.–275° F. In the above example, however, the useful temperature range of the well fluid has been extended significantly.

While the above embodiments describe particular compositions and a particular use (i.e., as a fluid loss control pill), it is expressly within the scope of the present invention that high density, thermally stable well fluids such as those described above may be used for a variety of purposes within the context of well drilling, whether or not a particular well fluid contains a polymer. Additionally, while reference has been made to particular salts, it is expressly within the scope of the present invention that other mixtures of salts may be used in conjunction with the above described formates. For example, it will be clear to one of ordinary skill in the art that other salts may be used, such as $CaBr_2$, $ZnCl_2$, $CaBr_2$, $ZnBr_2$, NaCl, KCl, $NH_4Cl$, $MgCl_2$, seawater, $Na_2S_2O_3$, and combinations thereof. Further, it is expressly within the scope of the present invention that combinations of formate salts may be used. For example, potassium and cesium formates may be used alone or in combination. Other formate salts may be used in combination as well.

Further, while the above embodiments describe a particular order of addition of the reagents, no restriction on scope is intended thereby. Further, while the above embodiments describe particular weight to volume ratios of salt, it is expressly within the scope of the present invention that a range of weight-to-volume ratio of salt between greater than 120% to about 400% may be used. Preferably, the weight-to-volume ratio of salt is about 150% to 350%. More preferably, the weight-to-volume ratio of salt is about 180% to 300%.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A well fluid comprising:
    water; and
    a salt, the salt comprising at least one formate salt, wherein a weight-to-volume ratio of the salt in the well fluid is within a range of greater than 260% to about 400%.

2. The well fluid of claim 1, wherein the at least one formate salt comprises cesium formate or a mixture of potassium formate and cesium formate.

3. The well fluid of claim 2, further comprising a halide salt.

4. The well fluid of claim 2, further comprising sodium bromide.

5. The well fluid of claim 1, wherein the at least one formate salt comprises potassium formate.

6. The well fluid of claim 5, further comprising a halide salt.

7. The well fluid of claim 5, further comprising sodium bromide.

8. The well fluid of claim 1, wherein the at least one formate salt comprises cesium formate.

9. The well fluid of claim 1, wherein the weight-to-volume ratio of the total salt content is within a range of about 290% to 400%.

10. The well fluid of claim 1, wherein the weight-to-volume ratio of the total salt content is within a range of about 300% to 400%.

11. A well fluid comprising:
    water;
    a viscosifying agent; and
    a salt, the salt comprising at least one formate salt, wherein a weight-to-volume ratio of the salt content in the well fluid is within the range of greater than 260% to about 400%.

12. The well fluid of claim 11, wherein the at least one formate salt comprises cesium formate or a mixture of potassium formate and cesium formate.

13. The well fluid of claim 12, further comprising a halide salt.

14. The well fluid of claim 12, further comprising sodium bromide.

15. The well fluid of claim 11, wherein the at least one formate salt comprises potassium formate.

16. The well fluid of claim 15, further comprising a halide salt.

17. The well fluid of claim 15, further comprising sodium bromide.

18. The well fluid of claim 11, wherein the at least one formate salt comprises cesium formate.

19. The well fluid of claim 11, wherein the weight-to-volume ratio of the total salt content is within a range of about 290% to 400%.

20. The well fluid of claim 11, wherein the weight-to-volume ratio of the total salt content is within a range of about 300% to 400%.

21. A method of treating a well comprising:
injecting a well treating fluid into the well, wherein the well treating fluid comprises water and a salt, the salt comprising at least one formate salt, wherein the salt content in the well fluid is within the range of greater than 260% to about 400%.

22. The method of claim 21, wherein the at least one formate salt comprises cesium formate or a mixture of potassium formate and cesium formate.

23. The method of claim 22, further comprising a halide salt.

24. The method of claim 22, further comprising sodium bromide.

25. The method of claim 21, wherein the at least one formate salt comprises potassium formate.

26. The method of claim 25, further comprising a halide salt.

27. The method of claim 25, further comprising sodium bromide.

28. The method of claim 21, wherein the at least one formate salt comprises cesium formate.

29. The method of claim 21, wherein the weight-to-volume ratio of the total salt content is within a range of about 290% to 400%.

30. The method of claim 21, wherein the weight-to-volume ratio of the total salt content is within a range of about 300% to 400%.

31. A method of treating a well comprising:
injecting a well treating fluid into the well, wherein the well treating fluid comprises water, a viscosifying agent, and a salt, the salt comprising at least one formate salt, wherein the salt content in the well fluid is within the range of greater than 260% to about 400%.

32. The method of claim 31, wherein the at least one formate salt comprises cesium formate or a mixture of potassium formate and cesium formate.

33. The method of claim 32, further comprising a halide salt.

34. The method of claim 32, further comprising sodium bromide.

35. The method of claim 31, wherein the at least one formate salt comprises potassium formate.

36. The method of claim 35, further comprising a halide salt.

37. The method of claim 35, further comprising sodium bromide.

38. The method of claim 31, wherein the at least one formate salt comprises cesium formate.

39. The method of claim 31, wherein the weight-to-volume ratio of the total salt content is within a range of about 290% to 400%.

40. The method of claim 31, wherein the weight-to-volume ratio of the total salt content is within a range of about 300% to 400%.

* * * * *